United States Patent [19]

Sawada et al.

[11] Patent Number: 5,103,673
[45] Date of Patent: Apr. 14, 1992

[54] FLUID LEVEL INDICATOR FOR SMALL WATERCRAFT

[75] Inventors: Ryoji Sawada; Satoshi Yamamoto, both of Mori, Japan

[73] Assignee: Moriyama Kogyo Kabushiki Kaisha, Mori, Japan

[21] Appl. No.: 588,051

[22] Filed: Sep. 25, 1990

[30] Foreign Application Priority Data

Sep. 25, 1989 [JP] Japan .................. 1-246393

[51] Int. Cl.⁵ .......................................... G01F 23/72
[52] U.S. Cl. .................................. 73/313; 73/311; 73/322.5
[58] Field of Search .............. 73/305, 311, 313, 315, 73/319, 322.5, DIG. 5

[56] References Cited

U.S. PATENT DOCUMENTS

| 292,532 | 1/1984 | Beggs | 73/311 |
|---|---|---|---|
| 1,859,933 | 5/1932 | Nikonow | 73/313 |
| 3,646,293 | 2/1972 | Howard | 73/313 X |
| 3,934,458 | 6/1990 | Warburton | 73/311 X |
| 4,056,979 | 11/1977 | Bongort et al. | 73/313 |
| 4,084,436 | 4/1978 | Smitherman | 73/313 |
| 4,627,283 | 12/1986 | Nishida et al. | 73/313 |
| 4,748,299 | 5/1988 | Custer | 73/319 X |

FOREIGN PATENT DOCUMENTS

| 257116 | 6/1988 | Fed. Rep. of Germany | 73/305 |
|---|---|---|---|
| 215512 | 12/1983 | Japan | 73/311 |
| 538236 | 12/1976 | U.S.S.R. | 73/305 |

Primary Examiner—William A. Cuchlinski, Jr.
Assistant Examiner—G. Bradley Bennett
Attorney, Agent, or Firm—Ernest A. Beutler

[57] ABSTRACT

A fluid level indicator for a small watercraft is provided which can be used to effectively detect and indicate a fluid level in a small watercraft even when the watercraft is experiencing severe rocking or up and down movements during operation and which is able to detect and distinguish the fluid level at a number of different positions. The fluid level indicator comprises a fluid level detector which includes a guide member, preferably cylindrical, generally vertically disposed in a fluid tank. A plurality of floats each having a magnet are slidably received for movement along the guide member within a designated section. In the illustrated embodiments, reed type switches one or more of which are associated with each of the floats are positioned within the guide member for detecting the position of the corresponding float along the guide. An indicator plate, preferably of the LDC type, is operatively connected to the fluid level detector for indicating the detected fluid level in the tank.

9 Claims, 4 Drawing Sheets

FLUID LEVEL INDICATOR FOR SMALL WATERCRAFT

BACKGROUND OF THE INVENTION

This invention relates to a fluid level indicator for a small watercraft, and more particularly to a fluid level indicator which can provide a useful indication of a particular fluid level in a small watercraft even when the watercraft is experiencing severe rocking and up and down movements during operation and which is able to detect the fluid level at a number of positions.

One type of particularly popular small watercraft is of the jet propelled type and is designed to be operated by a single rider who is seated on the seat in straddle-like fashion. This type of small watercraft is highly maneuverable and is very sporting in nature. A control bridge is normally located forwardly of the seat and carries handlebars which are positioned where the rider may conveniently grasp them to steer the watercraft. An instrument panel may also be positioned on the control bridge in view of the rider and may include an indicator for a fluid such as fuel or oil.

One type of known device for detecting the fluid level in a fuel or oil tank of a boat includes a pivotal arm having a float at one end thereof. Fluctuation of the fluid level causes vertical displacement of the float so that the fluid level may be detected in reference to the angular orientation of the pivotal arm. While this type of device is generally satisfactory for large watercraft, it is not well suited for smaller watercraft which are more strongly influenced by wind and water forces. When this type of device is applied to a small watercraft, the float tends to vibrate or move when the fluid is agitated as a result of these wind and/or water forces which cause the small watercraft to rock or move up and down.

Another type of device used for detecting the fluid level in a fuel or oil tank of a boat includes a vertical guide member disposed in the tank, a single float vertically movable and slidably supported on the guide, and reed switches positioned within the guide for detecting the position of the float along the guide. FIG. 1 illustrates such a device. In this figure, the vertical guide member is designated by the numeral 61 within which three vertically spaced apart reed switches 62a through 62c are disposed. An annular float 63 having a permanent magnet 64 is slidably received by the guide 61. The switches 62a through 62c are turned on and off on based on the position of the float 63 in the sections A through E as follows:

| POSITION OF THE FLOAT | SWITCH 62a | 62b | 62c |
|---|---|---|---|
| Section E | off | off | on |
| Section D | off | off | off |
| Section C | off | on | off |
| Section B | off | off | off |
| Section A | on | off | off |

As can be seen from the above, this type of arrangement does not distinguish between the float being in section B and in section D. This problem still occurs even if the number of switches are increased to four or more. Decreasing the number of switches to one or two with this type of arrangement will decrease the number of sections so that the fluid level can be detected at only a limited number of positions.

It is therefore a principal object of this invention to provide a fluid level indicator which can be used to effectively detect and indicate a fluid level in a small watercraft even when the watercraft is experiencing severe rocking or up and down movements during operation.

It is a further object of this invention to provide a fluid level indicator for a small watercraft which is able to detect and distinguish the fluid level at a number of different positions.

SUMMARY OF THE INVENTION

A fluid level indicator for a small watercraft is provided which comprises fluid detecting means including a guide member, preferably cylindrical, generally vertically disposed in a fluid tank. A plurality of floats each having a magnet are slidably received for movement along the guide member within a designated section. Means associated with each of the floats are positioned within the guide member for detecting the position of the corresponding float along the guide. Instrument indicating means are operatively connected to the fluid detecting means for indicating the detected fluid level in the tank.

In a first embodiment, the fluid detecting means includes a plurality of reed switches one associated with each float and a plurality of resistors one associated with each of the reed switches.

In a second embodiment, the fluid detecting means includes a plurality of reed switches two associated with each float and a plurality of resistors one associated with each of the reed switches.

In a third embodiment, the fluid detecting means includes a plurality of reed switches in circuit wherein each switch has a separate ground terminal, and a common terminal for all of the switches connects the fluid detecting means to the instrument indicating means.

DETAILED DESCRIPTION OF THE PREFERRED EMBODIMENTS

Figure 2:
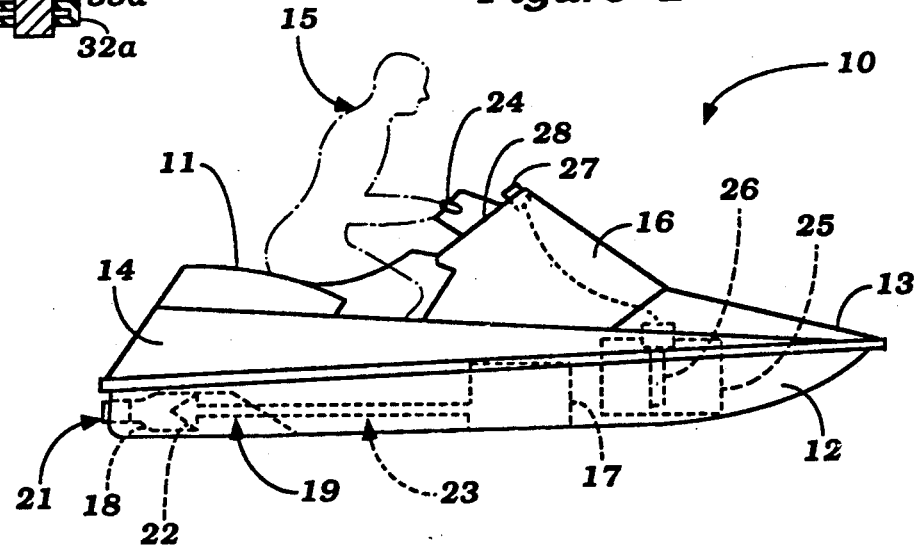
FIG. 2 is a side elevational view of a small watercraft showing a rider in phantom seated on the seat of the watercraft constructed in accordance with the invention.

Referring to FIG. 2, a small watercraft constructed in accordance with embodiments of the invention is identified generally by the reference numeral 10. This small watercraft 10 is depicted as being of the jet propelled type designed to be operated by a single rider 15 seated in straddle fashion in the seat 11 of the watercraft 10. It is to be understood, however, that the invention may be utilized in conjunction with other types of small watercraft. The invention has, however, particular utility in the type of watercraft described and depicted herein.

The watercraft 10 is comprised of a hull having a lower portion 12 and a deck portion 13 each of which may be conveniently formed from a molded fiberglass reinforced plastic, as is well known in this art. The seat is positioned rearwardly of the deck portion 13 and has a pair of depressed foot areas that are disposed on opposite sides thereof and which are positioned inwardly of raised funnels 14. As may be seen, the rider 15, shown in phantom in FIG. 2, may be seated on the seat 11 with his feet and lower legs in the depressed foot areas.

A control bridge 16 is provided forwardly of the seat 11 on the deck portion 13 and an internal combustion engine 17 is positioned beneath the bridge 16 within an engine compartment formed by the lower portion of the hull 12 and the deck portion 13. This internal combustion engine 17 drives a jet propulsion unit which is positioned within a tunnel formed at the rear of the lower hull portion 12 beneath the seat 11.

A water passage 18 is formed in the rear of the lower portion of the hull 12 and extends from a water intake port 19 provided in the bottom of lower hull portion 12 to a pivotally supported discharge nozzle 21 which is positioned in the rear end of the lower hull portion 12. This discharge nozzle 21 is pivotal about a vertically extending axis for steering purposes, as is well known in this art. Disposed in the water passage 18 is a propeller 22 having a propeller shaft 23 which is driven by the engine 17. In operation, water is drawn in through the intake port 19 into the water passage 18 and is injected out of the discharge nozzle 21 by the propeller 22 so as to produce the propulsion force for driving the watercraft 10.

A handlebar assembly 24 is carried by the bridge 16 forwardly of the seat 11 and includes handlebars in a position where the rider 15 may conveniently grasp them to steer the discharge nozzle 21. As is common in this art, a steering lever extends outwardly from one side of the steerable discharge nozzle 21 and is connected by means of a bowden wire to a steering arm formed at the lower end of the handlebar assembly 24 for steering of the watercraft 10.

A fuel tank 25 is disposed forwardly of the engine 17 in the lower portion of the hull 12. Extending into the fuel tank 25 is a first detecting means which includes a fluid level detector 26 whose output signal is transmitted to fuel meter 27 mounted on an instrument panel 28 on the control bridge 16 for indicating the amount of fuel remaining in the tank 25.

Figure 3:
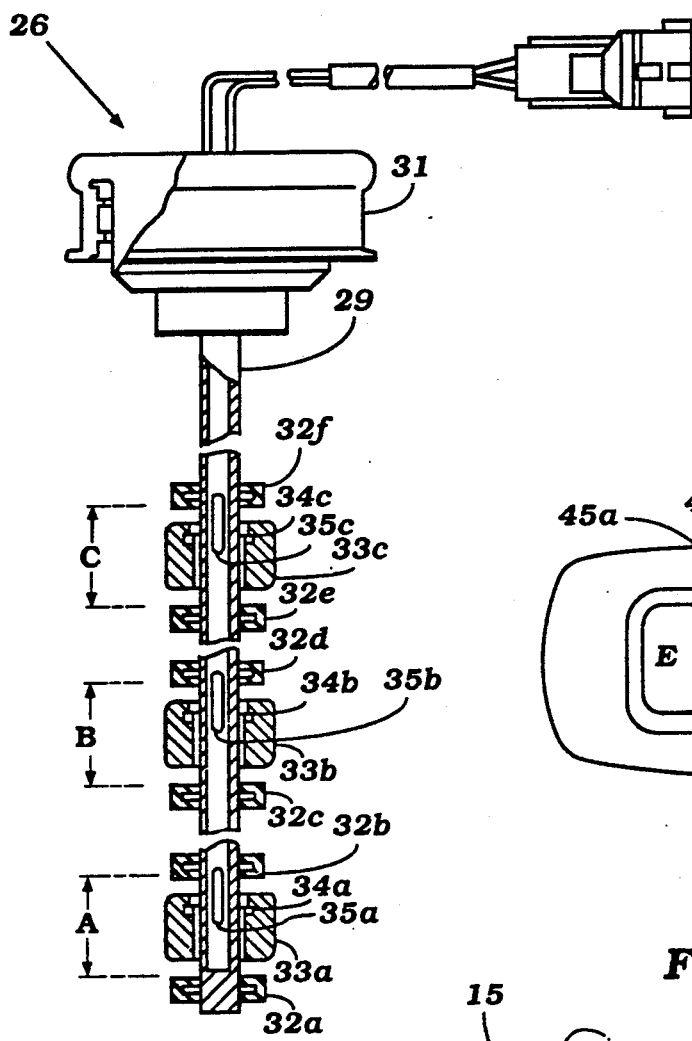
FIG. 3 shows a fluid level detector constructed in accordance with a first embodiment of the invention, with parts shown in cross section and other parts broken away.

Referring now to FIG. 3, the fluid level detector 26 includes a cylindrical guide 29 extending downwardly into the fuel tank 25 from a cap 31. Six stoppers 32a through 32f are affixed to the guide 29. Stoppers 32a and 32b define a section designated by the letter A along the cylindrical guide 29; stoppers 32c and 32d define a section B along the guide 29; and stoppers 32e and 32f define a section C along the guide 29. Three floats 33a through 33c having permanent magnets 34a through 34c respectively are slidably received for vertical movement along the cylindrical guide 29 within the sections A, B or C respectively. The detector 26 further includes three reed type switches 35a through 35c, one associated with each float 33a through 33c for detecting the position of the corresponding float 33a through 33c, and resistors 36a through 36c connected in parallel with the reed switches 35a through 35c respectively (see FIG. 4). Alternatively, Hall elements, magnetic resistance elements, devices using static capacitors, or devices using light-emitting and/or light sensing elements may be utilized instead of the reed switches 35a through 35c to detect the positions of the floats 33a through 33c.

The top and bottom of each of the stoppers 32a through 32f is covered with a rubber material to absorb the shocks associated with the movement of the floats 33a through 33c along the cylindrical guide 29, which occurs as a result of fluctuations in the fluid level in the fuel tank 25.

Figure 4:
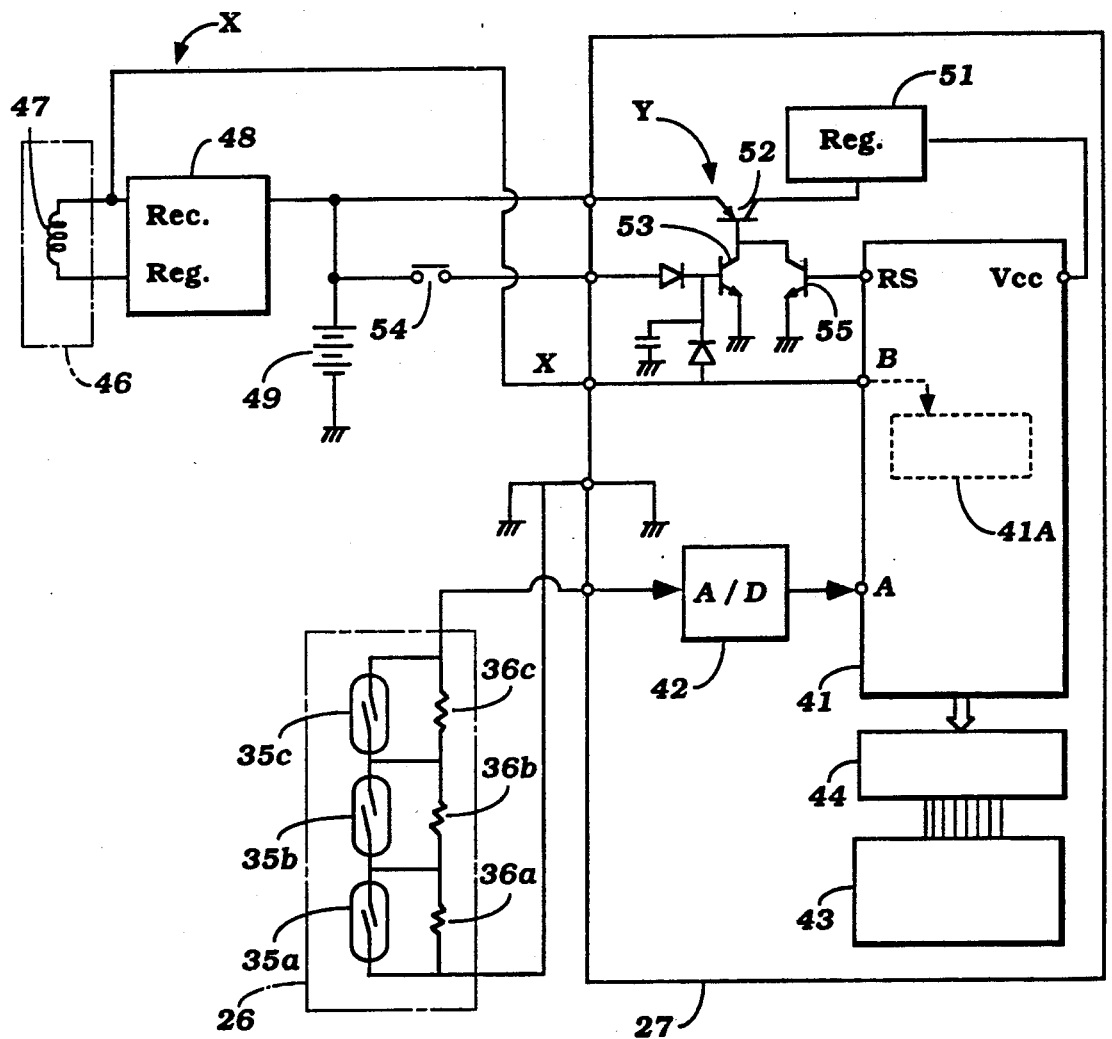
FIG. 4 is a circuit diagram in accordance with embodiments of the invention.

Referring now to FIG. 4, the reed switches 35a through 35c are connected in series with one end of the circuit being grounded and connected to the earth terminal end of the fuel meter 27. The other end of the circuit is connected to a data input terminal A of a central processing unit (CPU) or microprocessor indicated by the numeral 41 through an A/D converter 42.

As the floats 33a through 33c move within their respective sections A, B, or C in response to the fluid level in the fuel tank 25, their associated magnets 34a through 34c open and close the corresponding reed switches 35a through 35c depending on the position of the associated float 33a through 33c. The CPU 41 receives a signal at its input terminal A from the fluid level detector 26 and determines the fluid level in the tank 25 based on the variation in resistance or output voltage of the fluid level detector 26, and transmits a signal indicative of this level to an instrument indicating means which comprises a liquid crystal indicator plate 43 and an LCD driver 44.

Figure 5:
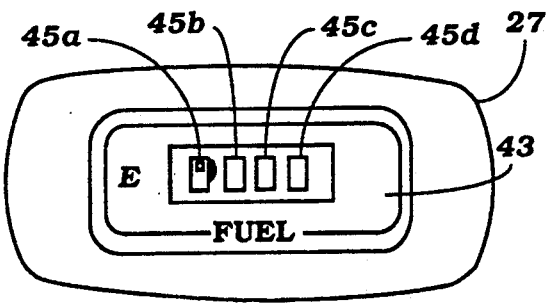
FIG. 5 shows the fuel meter and indicator plate constructed in accordance with embodiments of the invention.

As shown in FIG. 5, the indicator plate 43 of fuel meter 27 has four indicator elements 45a through 45d. When the fluid level in tank 25 is at a level below all of the floats 33a through 33c, all reed switches 35a through 35c are in the off state and indicator element 45a flashes on and off. As the fluid level is raised so as to come into contact with and cause upward movement of float 33a, reed switch 35a turns on and causes indicator element 45b to light. As the fluid level is further raised so as to cause upward movement of float 33b and then float 33c, reed switches 35b and 35c turn on successively to light the indicator elements 45c and 45d in order.

In FIG. 4, a second detecting means is indicated generally by the letter X and comprises an electromagnetic generator 46 having a generator coil 47. The output voltage from the coil 47 is rectified in a rectifying-voltage controlling circuit 48 to a predetermined voltage (i.e., 12 V) and flows to the positive terminal of a battery 49. The voltage output from the generator coil 47 also provides an alternate current voltage signal x during operation of the engine 17 which is transmitted to an input terminal B of the central processing unit 41 and to switching means indicated generally by the letter Y. This signal x is indicative of whether or not the engine 17 is in the on or off state.

Input terminal B functions as an "interruption port". Each time the alternate current voltage signal x is received by the central processing unit 41, a timer 41A is initialized. When the signal x is not received, the timer 41A is started to count down a predetermined time, at which time if the signal x is still not received the CPU shuts off.

Switching means Y is adapted to turn the indicator plate 43 on and off on the basis of the signal x ouputted by the generator coil 47, or on the basis of current received directly from the battery 49 for the predetermined period of time after a manual start switch 54 is depressed. The switching means Y selectively connects and disconnects the CPU 41 from a constant voltage circuit 51 which supplies a power voltage $V_{cc}$ to the CPU 41. A pnp transistor 52 is positioned between the constant voltage circuit 51 and the battery 49. This pnp transistor 52 is actuated or turned on by an npn transistor 53 which, in turn, is actuated or turned on by the signal x, or alternatively by the manual start switch 54 for the predetermined period of time, for example 30 seconds, even if the engine 17 is not started. Thereafter, actuation of the transistors 52 and 53 is based solely on the signal x.

When the engine start switch 54 is depressed, charge from the battery 49 flows to the base of npn transistor 53 so as to actuate transistors 53 and 52 for the predetermined period of time, i.e., 30 seconds. When this occurs, the constant voltage circuit 51 is actuated to supply voltage $V_{cc}$ to the central processing unit 41 to actuate the CPU 41. An npn transistor is indicated by the reference numeral 55 and is of the self hold type which is actuated to earth the base of transistor 52 when the RS (running/stop) output terminal of the central processing unit 41 is at a high (H) level, which occurs when the central processing unit 41 is in the operational state.

If the engine 17 is not started during that predetermined time, the CPU 41 will be disconnected from the constant voltage circuit 51 so as to turn of the indicator plate 43. If, however, the engine 17 is started during that time, the signal x generated by the generator coil 47 when the engine 17 is running will continue to maintain the switching means Y, CPU 41 and indicator plate 43 in the actuated state after the manual start switch 54 is released.

Figure 6:
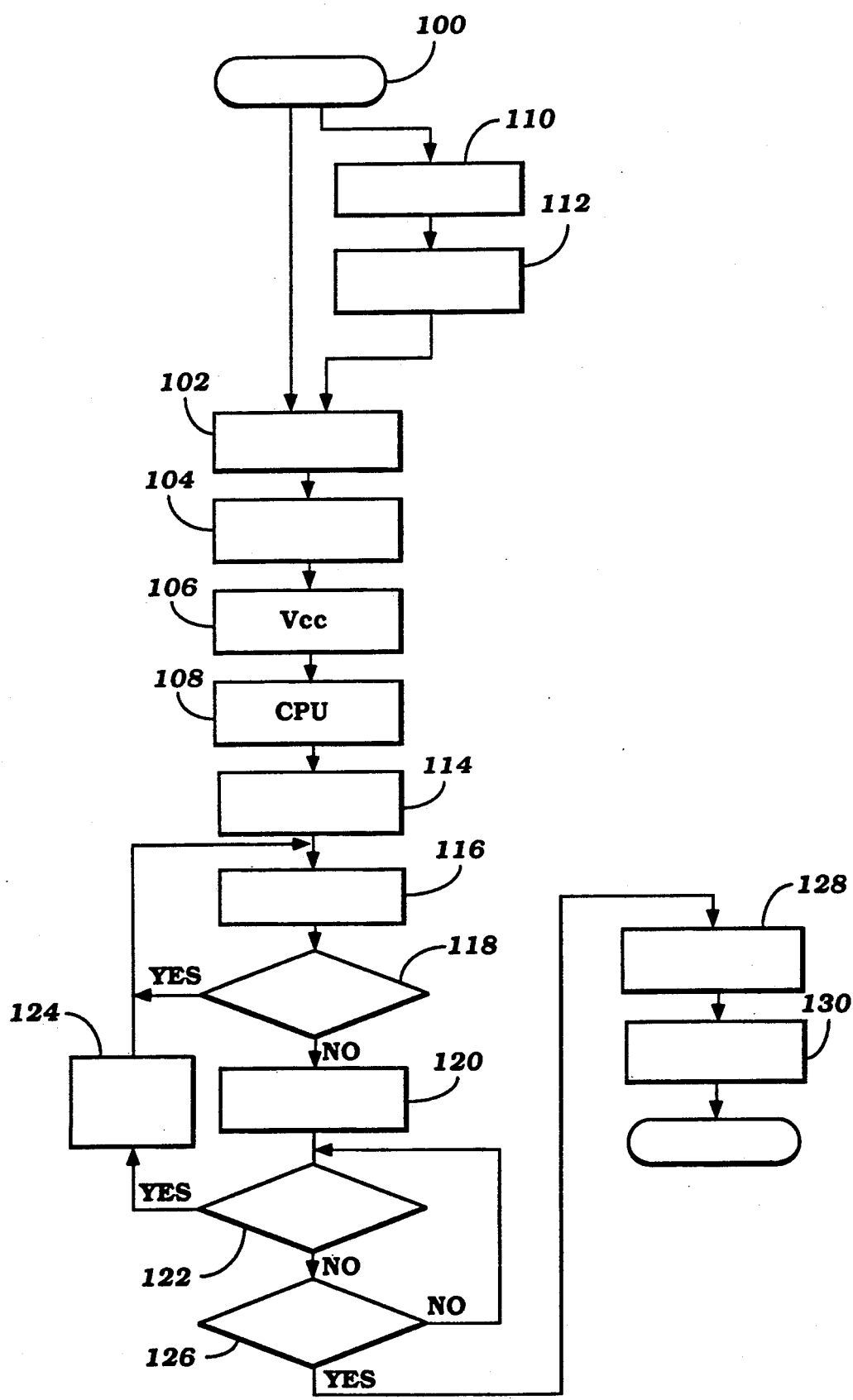
FIG. 6 is an operational flow diagram of embodiments of the invention.

The operation of the fluid level indicator will now be described with reference to FIG. 6. At the outset, the engine start switch 54 is depressed (step 100) to turn on or actuate the transistors 53 and 52 (steps 102 and 104 respectively). When this occurs, the power source voltage $V_{cc}$ is supplied to the CPU 41 (step 106) to actuate the CPU 41 (step 108). When the start switch 54 which is operatively connected to a starter motor of the engine 17 is depressed so as to start the engine 17 (step 110), the signal x is inputted at the start of the engine 17 to the input terminal B of the the CPU 41 and to npn transistor 53 (step 112). After the start switch 54 is released when the engine is started, the signal x is used to continue to actuate the transistors 53 and 52 (step 102). If the engine 17 is not started within the predetermined period of time after the start switch 54 is depressed, these transistors will turn off.

When the CPU 41 is actuated (step 108), the RS terminal thereof is at the H level so that the transistor 55 is turned on so as to maintain transistor 53 in the actuated state (step 114). Since the CPU 41 is in the operating or actuated state, the fluid level in tank 25 is indicated on the indicator plate 43 according to the output of fluid level detector 26 (step 116).

As long as the engine 17 continues to run, the fluid level will be indicated on the indicator plate 43. If, however, the the engine 17 is stopped and the signal x is not inputted, the timer 41A of the CPU 41 is started to count down the predetermined period of time (step 120). At step 122, a determination is made as to whether or not the signal x has been received during this time period. If the signal x is received, the timer 41A is cleared (step 124) so as to maintain actuation of the indicator plate 43. When the predetermined period of time (i.e., 30 seconds) has elapsed without receipt of the signal x by the CPU 41 (step 126) the CPU 41 reduces the RS terminal to an L or low level. The transistors 55 and 52 are then turned off (step 128) to break the connection of the CPU 41 with the power source, and thereby to turn off the indicator plate 43 (step 130).

In the above embodiment, when the start switch 54 is depressed, the CPU 41 operates to actuate the indicator plate 43 for a predetermined period of time, for example 30 seconds, even if the engine 17 is not started. However, the present invention may also be arranged so that the indicator plate 43 is actuated only by the signal x produced by the generator coil 47. It is also possible with this invention to use various other types of indicating means such as the analog type in place of the liquid crystal indicator plate 43 and LCD driver 44. Further, the indicator assembly described herein is not limited only to determining the fuel level in a fuel tank but may also be used to determine other fluid levels such as oil level in a small watercraft.

Figure 7:
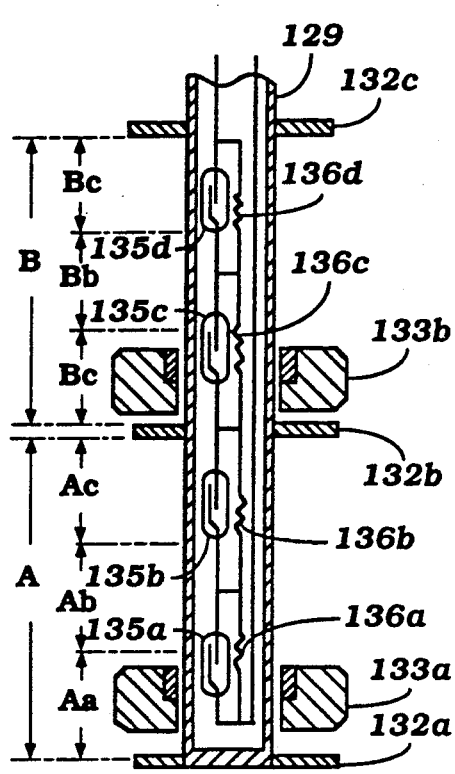
FIG. 7 is a sectional view of the cylindrical guide showing a second embodiment of the invention.

FIG. 7 illustrates a second embodiment of the invention. In this embodiment, the cylindrical guide is indicated by the numeral 129. The guide 129 is divided by stoppers 132a through 132c which are affixed to the guide 129. Stoppers 132a and 132b define a section A within which a float 133a moves along the guide 129 and stoppers 132b and 132c define a section B within which a float 133b moves. Each of these sections A and B is further divided into subsections Aa, Ab and Ac; and Ba, Bb and Bc respectively. Reed switches 135a through 135d are positioned in the guide 129 in subsections Aa, Ac, Ba and Bc respectively and are connected in parallel with resistors 136a through 136d respectively. Similar to the first embodiment, two lead wires are used for connection to the fuel meter 27. With this arrangement of one float in combination with two reed switches, a useful determination of the fluid level may be made at many different positions along the guide 129 using only two floats 133a and 133b.

Figure 8:
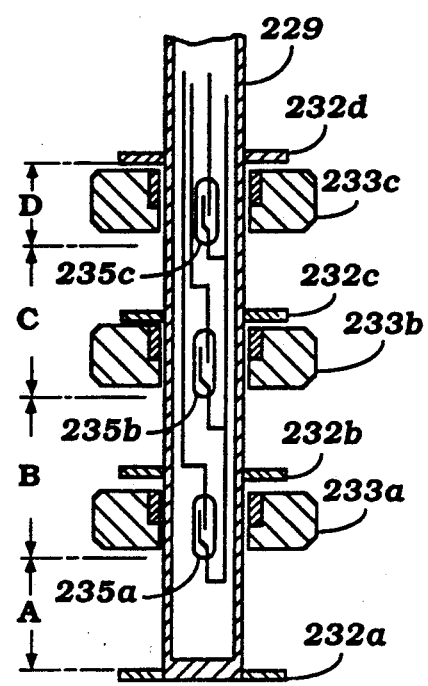
FIG. 8 is a sectional view of the cylindrical guide showing a third embodiment of the invention.
Figure 1:
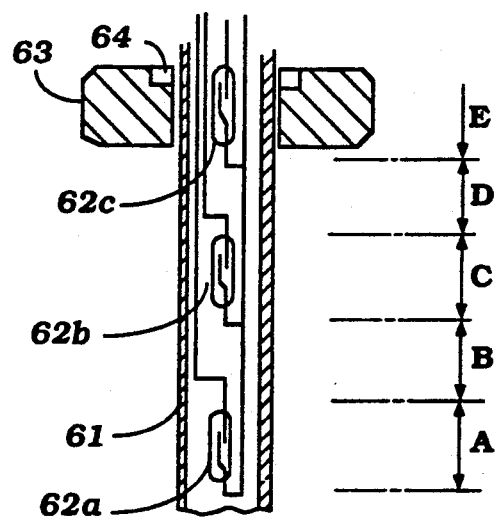
FIG. 1 shows a known fluid detecting arrangement.

FIG. 8 illustrates a third embodiment wherein reed switches 235a through 235c are positioned within the cylindrical guide 229 in sections B, C and D. The bottom boundary of section A is defined by stopper 232a while the top boundary is located between stopper 232a and 232b. Section B begins where section A ends and extends to a position between stoppers 232b and 232c where section C begins. The common boundary between sections C and D is between stoppers 232c and 232d while the top boundary of section D is defined by stopper 232d. Float 233a moves along the guide 229 in section A and the lower portion of section B between stoppers 232a and 232b; float 233b moves along the guide 229 in the upper portion of section B and the lower portion of section C between stoppers 232b and 232c; and float 233c moves along the guide 229 in the upper portion of section C and in section D. One terminal of each of the reed switches 235a through 235c is grounded with the other terminal common to the reed switches 235a through 235c being connected to the fuel meter 27.

Although several embodiments of the invention have been illustrated and described, various changes and modifications may be made without departing from the spirit and scope of the invention, as defined by the appended claims.

We claim:

1. A fluid level detector for a small watercraft comprising a fluid tank, fluid detecting means including a guide member generally vertically disposed in said tank, a plurality of stoppers each comprised of and covered by shock absorbing means, said stoppers being affixed to said guide member and spaced apart so as to define a plurality of sections along said guide member, a plurality of floats each having a magnet and each slidably received for movement along said guide member within a designated section, means associated with each of the floats for detecting the position of the corresponding float along said guide member, said shock absorbing means protecting each of said floats and its associated magnet, and wherein each of said magnets is prevented from making direct contact with said stoppers.

2. A fluid level detector as recited in claim 1, wherein said fluid detecting means comprises a plurality of reed switches one associated with each float and a plurality of resistors one associated with each of the reed switches.

3. A fluid level detector as recited in claim 1, wherein said fluid detecting means comprises a plurality of reed switches two associated with each float and a plurality of resistors one associated with each of the reed switches.

4. A fluid level detector as recited in claim 1, wherein said guide member is cylindrical.

5. A fluid level detector as recited in claim 1, wherein said shock absorbing means comprises a rubber material.

6. A fluid level detector as recited in claim 1, wherein said shock absorbing means also covers each of said floats and its associated magnet.

7. A fluid level detector as recited in claim 6, wherein said shock absorbing means comprises a rubber material.

8. A fluid level detector as recited in claim 1, further comprising instrument indicating means operatively connected to said fluid detecting means for indicating the detected fluid level in said tank.

9. A fluid level detector as recited in claim 8, wherein said fluid detecting means comprises a plurality of reed switches in circuit wherein each switch has a separate ground terminal and a terminal common to all reed switches is connected to said instrument indicating means.

* * * * *